United States Patent [19]

Sommers

[11] Patent Number: 4,948,570
[45] Date of Patent: Aug. 14, 1990

[54] PROCESS FOR LOWERING RESIDUAL TANTALUM VALUES IN NIOBIUM

[75] Inventor: James A. Sommers, Albany, Oreg.

[73] Assignee: Teledyne Industries, Inc., Albany, Oreg.

[21] Appl. No.: 378,319

[22] Filed: Jul. 11, 1989

[51] Int. Cl.$^5$ .............................................. C01G 33/00
[52] U.S. Cl. ....................................... 423/65; 423/67; 423/68; 423/592
[58] Field of Search ...................... 423/65, 67, 68, 592

[56] References Cited

U.S. PATENT DOCUMENTS 4,490,340 12/1984 Ritsko et al. .......................... 423/65
4,537,750 8/1985 Ritsko et al. .......................... 423/65

FOREIGN PATENT DOCUMENTS 646454 8/1962 Canada .................................. 423/68

OTHER PUBLICATIONS

Miller, G. L., "The Separation of Tartalum and Niobium" The Industrial Chemist 35, Apr., 1959, pp. 175–182.

*Primary Examiner*—Robert L. Stoll
*Attorney, Agent, or Firm*—Shoemaker and Mattare, Ltd.

[57] ABSTRACT

The process for removing tantalum values from niobium values wherein a $NbCl_5/TaCl_5$ charge mixture having a molar ratio from about 10/1 to about 10,000/1 is mixed with a 8N to 20N aqueous HCl solution at a total charge concentration of from about 50 to about 150 parts/100 parts by weight of the HCl solution to form a hydrolysis system, and wherein at least the surface of the hydrolysis system is contacted with air or a gas-containing air for a period of time within which a precipitate settles out at an average rate of from about 0.1 to about 6.0% by weight of the initial solids charge per hour.

8 Claims, No Drawings

PROCESS FOR LOWERING RESIDUAL TANTALUM VALUES IN NIOBIUM

BACKGROUND OF THE INVENTION

This invention concerns the processing of Tantalum contaminated Niobium materials whereby extremely low levels of Tantalum values remain in the Niobium product, and particularly concerns such a purification process which requires a minimum of equipment, labor and materials.

Current practice for the production of $Nb_2O_5$ utilizes for example, $NbCl_5$ from a ferroniobium (FeNb) chlorinator as the feed for $Nb_2O_5$ production. The $NbCl_5$ is mixed with $H_2O$ forming a hydrolysed $NbOCl_3 \cdot xH_2O$ in an acidified (HCl) solution. This solution is pH adjusted with ammonia. The solution is then filtered and calcined at high temperature to produce dry $Nb_2O_5$. Niobium metal is routinely manufactured from the oxide by the metallothermic reduction thereof.

The ferroniobium starting or feed material is typically one or a mixture of commercially available alloys which, even though they are already costly and upgraded products, have tantalum levels too high for many applications. For example, a level of tantalum in a metallurgical grade ferroniobium is about 2000 weight parts per million of tantalum/niobium+tantalum. However, many applications for niobium and its alloys require less than 500 ppm and some need even less than 200 ppm. Since ferroniobium and commercial niobium oxide are already upgraded products having low tantalum levels, it is uneconomical to chemically activate them and submit them to distillation or liquid-liquid extraction to eliminate the small remaining amounts of tantalum. There is therefore a need for a process which will accomplish this refining step without the costly and complicated processing equipment used in binary distillation or aqueous separation schemes.

The total separation of niobium and tantalum is very difficult and consequently there are considerable separation processes proposed in the literature. Methods for accomplishing the separation range from anhydrous, such as fractional distillation of the liquid pentachlorides, to aqueous employing liquid-liquid extraction and ion-exchange chromatography. A historical overview can be found in Fairbrother's, "The Chemistry of Niobium and Tantalum", Elsevier, Amsterdam, 1967, p. 7-10. A summary of proposed processes is also given in the unclassified U.S. Atomic Energy Commission report ISC-793 published 8-15-56 and entitled SEPARATION OF NIOBIUM AND TANTALUM-A LITERATURE SURVEY. All of these methods, as applied to industrial production, have in common that they require large, multi-stage installations and are operated to produce, as one product, niobium with low tantalum levels, and as the other product, tantalum with low niobium levels. The disadvantage of such a plant is the large capital required to generate what may be a minority product at one end of the separation, with such capital requirements being far too large to be repaid by a minority product, i.e., a highly-upgraded tantalum concentrate.

Objects of the invention therefore, are: to provide a process for markedly lowering the levels of tantalum values in niobium materials, which process is compatible with the above noted sequence of conversion of ferroniobium to niobium oxide; and to provide such a process which can operate on intermediates of the conventional conversion, which requires little or no extra process equipment, which consumes a minimum of chemicals, which does not generate waste streams which contain fluorides, and which requires little or no additional manpower.

These and other objects hereinafter appearing have been attained in accordance with the present invention which is defined in its broad sense as the process for removing tantalum values from niobium values comprising admixing a $NbCl_5/TaCl_5$ charge having a molar ratio from about 10/1 to about 10,000/1 with a 8N to 20N aqueous HCl solution at a total weight of concentrated HCl ranging from about 75% to about 200% or the weight of the unseparated $NbCl_5/TaCl_5$, and contacting at least the surface of said system with a gas capable of effecting a separation such as by active or passive circulation or by sparging and the like for a period of time within which a precipitate settles out at an average rate of from about 0.1 to about 6.0% by weight of the initial solids charge per hour.

In certain preferred embodiments:
(a) the average settling rate is from about 0.2 to about 3.0% per hour;
(b) the temperature of said hydrolysis system is maintained at between about 5 degrees C. to about 26 degrees C. during said period;
(c) the total charge concentration is from about 70 to about 100 parts/100 parts by weight of said solution; and
(d) the precipitate is filtered from said reaction system, the filtrate is then hydrolyzed with ammonium hydroxide and the resultant solids calcined to produce $Nb_2O_5$ having a tantalum values level of below about 500 ppm preferably below about 300 ppm.

A significant aspect of the present invention is that the two streams which emerge can both be processed to niobium alloys classified as high-purity, with the tantalum-lean one being classified as low-tantalum. The prior art does not address this problem, since the plant equipment which they require is very extensive, even if it is deliberately operated in a inefficient manner to meet the separation requirements. In essence, the prior art has concentrated on processes which give separations which are somewhat better than may be required, but at costs which are far too high. Thus there is need for a process which costs very little to institute or operate. The processes of the prior art typically require multiple large recycle loops to reclaim product and leave organic phases or resins in a condition to accept further product.

The present invention makes use of an effect discovered in the dissolution of niobium pentachloride in solutions of concentrated hydrochloric acid. A solution made by adding niobium pentachloride, which contains some tantalum pentachloride, to very concentrated hydrochloric acid develops a precipitate slowly upon exposure to ambient atmosphere. The precipitate is observed to form at the meniscus and fine particles settle into the body of the liquid. When the resulting slurry is filtered and the filtrate processed to give $Nb_2O_5$, its tantalum level is found to be markedly lowered compared to that of the solids which sedimented out during the air exposure. Thus, the simple process of this invention uses only hydrochloric acid and suitable air exposure to achieve a significant separation.

Aqueous hydrolysis as typically employed, wherein solid niobium pentachloride powder is added to water, is highly exothermic, leaves a difficultly filterable suspension of hydrolysis products, and when the liquid and solid phases are isolated, is found to offer no significant niobium-tantalum separation. Hydrolysis is too rapid and, therefore, non-discriminating. By contrast, the solutions of the present invention form endothermically, remain clear in the absence of air, and on suitable contact with air, yield liquid and solid phases whose niobium values have low and high tantalum levels, respectively. It is obvious that with respect to a typical, non-separating hydrolysis process, the process of this invention requires addition of only hydrochloric acid, a temporary storage vessel and a means for contacting the solution with air. All these items can be provided quickly and cheaply, compared to the large capital-intensive installations required for other separation processes.

The present process is operable over a wide range of parameters, however, in general it is detrimental to try to force the separation-producing reactions to occur too rapidly, for then the niobium-tantalum separation suffers. This is illustrated in Example 3 below. Exposure to a gas is required, as is afforded by an open vessel, or by bubbling air through the solution. The gas to be used can be gas capable of effecting a separation effect such as with air, nitrogen and the like such as seen in Example 4. In many instances, it may be more economical to use air. It is noted that solutions left to stand in closed vessels remain clear. Also, if two vessels of different dimensions are used, the ratio of, rate of formation of solids/air-solution interfacial area, has similar numerical values for both, i.e., the reaction will occur faster in a wide, shallow vessel.

The following examples will further illustrate specific embodiments of the present process.

EXAMPLE 1

90 G. $NbCl_5$ were dissolved in 110 ml of concentrated (37%) hydrochloric acid, and the beaker containing the solution allowed to stand open to air. After one hour, a precipitate was observed to form at the meniscus. Gradually, a layer of white solids deposited on the bottom of the beaker. After standing for 42 hours, the solids were filtered away, the liquid was hydrolyzed with concentrated ammonium hydroxide, and both solids were calcined at 800 degrees C. The 18.00 g of $Nb_2O_5$ from the filtrate or liquid phase had a tantalum level of 300 parts per million (ppm) of Ta/Nb +Ta; the $Nb_2O_5$ from the solids, 15.43 g, had a tantalum level of 2960 ppm Ta/Nb +Ta.

EXAMPLE 2

75 G. of $NbCl_5$ were dissolved in 95 ml of concentrated HCl and the solution transferred to a 100 ml graduated cylinder. The solution was sparged with air by bubbling air into it through a tube which protruded below the liquid level. An air flow of 35 ml /min was set for 16 hours of overnight sparging. The flow was raised to 50 ml/min for a four-four period, then to about 100 ml/min for six hours. The mixture at this time consisted of a layer of white solids and a cloudy supernatant liquid. This mixture was filtered, the filtrate hydrolyzed with concentrated ammonium hydroxide, and both solids were calcined as in Example 1. The filtrate or liquid-derived $Nb_2O_5$, 8.80 g, had a tantalum level of 185 ppm and the $Nb_2O_5$ from the precipitated solids, 24.51 g, had a tantalum level of 2270 ppm.

EXAMPLE 3

75 G. of $NbCl_5$ were dissolved in 90 ml concentrated hydrochloric acid and the solution placed into a graduated cylinder as in Example 2. An air flow of 120 ml/min was maintained for 2½ hours. The liquid and solid fractions were processed as before. The $Nb_2O_5$ from the liquid fraction amounted to 4.62 g and had a tantalum level of 790 ppm, and the $Nb_2O_5$ from the solids, 26.94 g, contained 1940 ppm of tantalum. It is noted that in Example 2, 24.51 g of solids were generated in 26 hours, whereas in Example 3, 26.94 g were generated in 2 ½ hours, the two runs differing some ten-fold in the rate of precipitate production. In the Example 3 case, the tantalum level of the low-tantalum fraction was four-fold higher. This shows that excessively fast precipitate production is disadvantageous to good separation.

EXAMPLE 4

73.14 g of $NbCl_5$ were dissolved in 90 ml of concentrated HCl and the solution placed into a graduated cylinder as in Example 2. A flow of 25 ml/min of dry nitrogen gas was bubbled through the solution for four hours. After settling overnight, the liquid and solid fractions were processed as before. The $Nb_2O_5$ from the liquid fraction amounted to 18.97 g and had a tantalum level of 200 ppm; and the $Nb_2O_5$ from the solids, 13.68 g, contained 3930 ppm tantalum. This shows that the gas which contacts the solution need not be air.

The invention has been described in detail with particular reference to preferred embodiments thereof, but it will be understood that variations and modifications will be effected within the spirit and scope of the invention.

I claim:

1. The process for removing tantalum values from niobium values comprising admixing a $NbCl_5/TaCl_5$ charge having a molar ratio from about 10/1 to about 10,000/1 with a 8N to 20N aqueous HCl solution at a total charge concentration of from about 50 to about 150 parts/100 parts by weight of said HCl solution to form a reaction system, and contacting at least the surface of said hydrolysis system with a gas for a period of time within which a precipitate settles out at an average rate of from about 0.1 to about 6.0% by weight of the initial solids charge per hour.

2. The process of claim 1 wherein the average rate is from about 0.2 to about 3.0% per hour.

3. The process of claim 2 wherein the temperature of said system is maintained at between about 20 to about 26 degrees C. during said period.

4. The process of claim 1 wherein said total charge concentration is from about 70 to about 100 parts/100 parts by weight of said solution.

5. The process of claim 1 wherein said precipitate is filtered from said reaction system, the filtrate hydrolyzed with ammonium hydroxide and the resultant solids calcined to produce $Nb_2O_5$ having a tantalum values level of below about 500 ppm.

6. The process of claim 5 wherein the tantalum values level is below about 300 ppm.

7. The process of any one of claims 1-6 wherein said gas is bubbled through said hydrolysis system.

8. The process of claim 7 wherein the gas is air.

* * * * *